Patented May 27, 1952

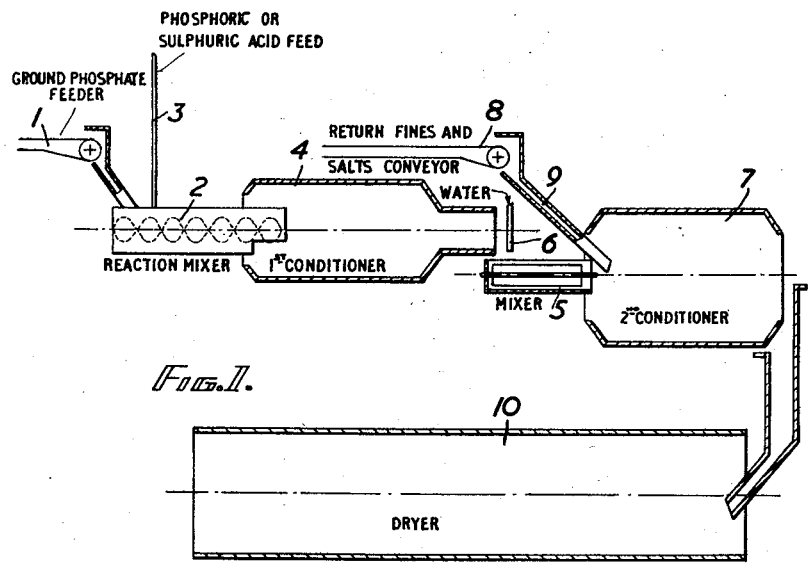
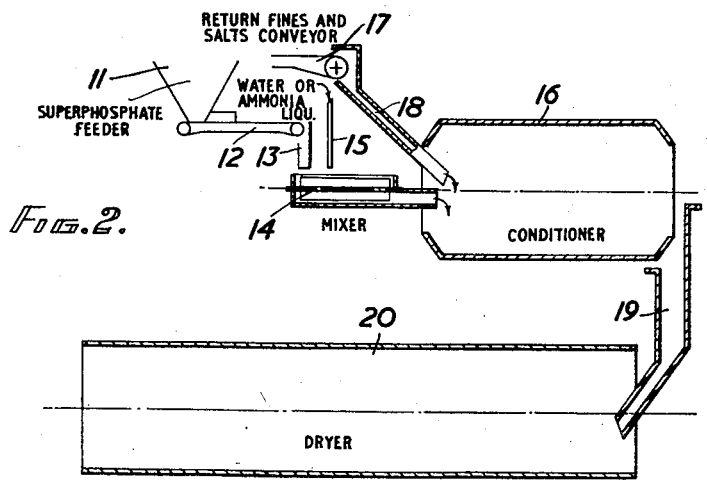

2,598,658

UNITED STATES PATENT OFFICE 2,598,658

GRANULATION OF PHOSPHATIC FERTILIZERS

John T. Procter, York, and Alexander Ogilvie, St. Albans, England

Application January 14, 1949, Serial No. 70,898
In Great Britain January 15, 1948

4 Claims. (Cl. 71—37)

This invention relates to the granulation of superphosphate fertiliser.

It is well known that in granulation operations moisture content is an important factor in the control of the granule size and our experience has shown that the best results are attained when the superphosphate is delivered to a rotary granulator or conditioner in the form of a flowable slurry.

In the production of granular superphosphate direct from acid and raw mineral phosphate, we have found that it is necessary to use a relatively weak acid in order to maintain the superphosphate throughout the mixing stage in a flowable state. The presence of more water in the acid gives rise to acceleration of the hydration of the solid phases of the slurry, so that even further dilution becomes necessary if fluidity is to be maintained.

We have, however, discovered that a slurry of satisfactory condition for granulation can be obtained with a very much smaller overall usage of water by the use of stronger acids and the consequent attainment of a solid condition, after which we again reduce to the flowable state by active mechanised homogenisation with a small addition of water after the main chemical action is substantially complete.

In this way the greatest use is made of the natural thixotropic property of the superphosphate by energetic mechanical kneading, and therefore a lower water addition is required to effect granulation. In consequence, an improved output capacity is obtained from any given size of drier-hardener. Alternatively, or in addition, a greater quantity of fines of bigger particle size may be rejected at the grading screen stage and re-processed within the plant, so leading to an improved uniformity in granule size within the finished product.

In a superphosphate granulation process which we have operated wherein two rotary granulators or conditioners are employed, the granulation of the superphosphate commenced in the first granulator or conditioner is continued in the second.

The present invention is related to this prior process in that in its preferred form two granulators or conditioners are employed, as hereafter described, but is distinguished from it in that, in order to get a satisfactory moisture content in the second granulator where final granulation is accomplished, sufficient moisture in the form of water and/or ammoniacal liquor is added to the granular or particulate product discharged from the first granulator to restore it again to the slurry condition. Thus the fundamental factor in the present process is the addition of moisture to matured or partially matured superphosphatic fertiliser to transform it into a slurry prior to its introduction into the rotary granulator or "conditioner," as it is usually and hereinafter called.

According to one method a second mixer is interposed between the first conditioner, which runs at a slow speed, and a second or subsequent conditioner, which runs at a much higher speed, in which mixer sufficient water and/or ammoniacal liquor is added to transform the granular or particulate product delivered to it from the first conditioner into a flowable slurry. In this second mixer effective mixing is carried out and means may be incorporated in the mixer for ensuring a ready and continuous delivery to the second conditioner and for retaining the mixture in the mixer for the desired period of time. An alternative arrangement, in this type of plant, is to incorporate the mixer in the delivery end of the first conditioner. Thus, in the first conditioner the superphosphatic slurry introduced into it from the reaction mixer is first changed to particulate solid form and is then again restored to a slurry, which slurry is discharged continuously into the second conditioner.

The best speeds for the conditioners can be obtained by a trial run but we may say that in one plant that has been run satisfactorily the speed of the first conditioner was 1 revolution per minute and the second 17 revolutions.

While the invention is primarily intended for use where the process starts with the unreacted raw rock and acid it is equally applicable for use in cases where the process starts with matured or partially matured superphosphate produced, for example in a "den."

It is to be understood that the invention is applicable to the granulation of superphosphate (including in that term double and triple superphosphate) or mixed phosphatic fertilisers. In the latter case the salts to be incorporated with the superphosphate can be introduced at various stages of the process, for example, into either the first or second conditioner, or the mixer, or one of them where more than one is employed, but experience has shown that it is preferable to introduce them into a conditioner.

That is to say we prefer to mix the salts into a superphosphate slurry in a rotary conditioner rather than add water to a pre-made mixture of superphosphate and salts.

We have discovered that the normal method of spraying water into a pre-made mixture of dry superphosphate and salts in a rotary conditioner does not produce as good a plasticity of the superphosphate content as is obtained by the addition of the same amount of moisture to the superphosphate under adequate mixing and agitating conditions prior to the addition of the salts.

In the accompanying drawings two methods of carrying out the invention are illustrated diagrammatically, Figure 1 showing the general arrangement of plant to be adopted where the process starts by mixing ground phosphate rock and acid in reacting proportions, and Figure 2 shows the arrangement where already made matured or partially matured superphosphate or superphosphatic fertiliser is to be granulated.

Referring first to Figure 1, the numeral 1 designates a conveying device by means of which ground phosphate rock is delivered to the reaction mixer 2 into which the acid required for the reaction is delivered by way of the pipe 3. The acid and rock are mixed together in the mixer until a slurry is formed. This slurry flows from the mixer in a continuous stream into the first conditioner 4 and from this conditioner, where it is converted into particulate or granular form, it flows continuously to a second slurrifying mixer 5 and is therein again transformed back to a slurry by admixture with moisture which, as before indicated, may be water and/or ammoniacal liquor, delivered to the mixer by the pipe 6. From this slurrifying mixer the slurry passes into the second conditioner 7, and, where mixed fertiliser is to be produced the fertiliser salts are introduced, by way of the conveyor 8 and chute 9 into the slurry together with "fines" and the reground oversize particles from the usual screening apparatus in the required quantity to establish the required moisture content, which, as is well known, is an important factor in the control of the granule size. For this reason should the quantity of "fines" and reground oversize particles be insufficient a proportion of the marketable end product can be reground. Conversely, if the "fines" and reground oversize particles should be more than required, additional water or ammoniacal liquor can be added in the slurrifying mixer or in the conditioner, for example, by spraying. Thus complete control of the moisture content can be provided for under all conditions. From the second conditioner 7 the granular product passes to a dryer hardener 10 and thence to the screening system of the plant, in accordance with known practice. The foregoing is the preferred arrangement but experience has shown that advantages accrue in the production of granular fertiliser from already made and matured, or partially matured, superphosphate or other superphosphatic fertiliser if, instead of adding moisture in the conditioner, in accordance with known practice, the reverse method is adopted, i. e. the superphosphatic fertiliser is first transformed by the addition of hot or cold water into a flowable slurry which is so balanced by the addition of moisture absorbing material (for example the "fines" and reground oversize and the salts in the case of a compound fertiliser if they have not been previously added) that it will give satisfactory granulation in the conditioner.

In Figure 2 the layout of another plant for carrying out the process according to the invention is shown diagrammatically.

Referring to this figure, the already made superphosphate or superphosphatic fertiliser is delivered from the hopper 11 by means of the conveyor 12 and chute 13 to a homogenising mixer 14, water or ammoniacal liquor being delivered to the mixer 14 by the pipe 15 in quantity sufficient to transform the superphosphate into a flowable slurry which flows continuously into the conditioner 16 and is mixed with the "fines" or other moisture absorbing material delivered to the conditioner by the conveyor 17 and chute 18. Here again, if a mixed fertiliser is to be granulated the additional fertiliser salts are preferably introduced into the conditioner and mixed with the slurry together with the "fines" or other moisture absorbing material. The granules produced in the conditioner 16 pass as before to the dryer-hardener 20 by way of the chute 19 and thence to the screening apparatus.

By this invention granular superphosphate or superphosphatic fertiliser in marketable condition is continuously produced as the end product of the process.

It will be understood by those skilled in the art and by reference to the prior specifications herein referred to that the conditioners rotate continuously, the particular speed of rotation depending upon conditions. We have found, however, that in the plant shown in Figure 1, satisfactory results are obtained if the first conditioner is rotated at a speed of 1 to 3 revolutions per minute, and the second conditioner rotated at a speed of 12 to 17 revolutions per minute.

In the plant illustrated in Figure 2 a conditioner speed of rotation of 12 to 17 revolutions per minute should produce satisfactory results.

It should be noted, however, that no hard and fast rules can be specified but experience has shown that by means of a short experimental run the best working conditions can very soon be established by the ordinary competent operator.

We claim:

1. A process for the production of superphosphatic fertilizer in granular form comprising mixing ground phosphate rock and acid in reacting proportions and of such a concentration as to produce a first flowable slurry, subjecting said first slurry to a relatively slow rolling and tumbling action in a first rotary chamber until the same is transformed into a relatively crude particulate solid form, in a separate operation mixing the resulting solid form with non-acidic aqueous liquid in excess of that required to form granules of the desired size so as to produce a second relatively thin flowable slurry, delivering said second slurry to a second rotary chamber, supplying moisture absorbing material in finely divided form to said second rotary chamber wherein it is mixed with said second slurry and subjecting the resulting mixture to a relatively rapid rolling, tumbling and drying action to transform it into granular form.

2. A process as claimed in claim 1 in which the moisture absorbing material comprises fines produced by the process.

3. A process as claimed in claim 1 in which the moisture absorbing material is introduced in excess into the second rotary chamber and is compensated for by the introduction of moisture into said second rotary chamber.

4. Process as claimed in claim 1 in which fertilizer salts are included in the moisture absorbing material introduced into the second rotary chamber to produce a mixed fertilizer.

JOHN T. PROCTER.
ALEXANDER OGILVIE.

REFERENCES CITED

The following references are of record in the file of this patent:

UNITED STATES PATENTS

| Number | Name | Date |
|---|---|---|
| 2,232,145 | Shoeld | Feb. 18, 1941 |
| 2,414,701 | Shoeld | Jan. 21, 1947 |
| 2,448,126 | Shoeld | Aug. 31, 1948 |

FOREIGN PATENTS

| Number | Country | Date |
|---|---|---|
| 559,482 | Great Britain | Feb. 22, 1944 |
| 590,660 | Great Britain | July 24, 1947 |